May 27, 1952
J. W. DAWSON
2,598,232
OSCILLATION GENERATOR
Filed June 11, 1946
2 SHEETS—SHEET 1
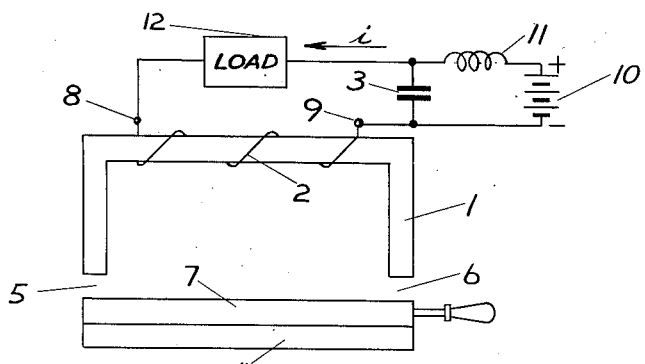
FIG. 1
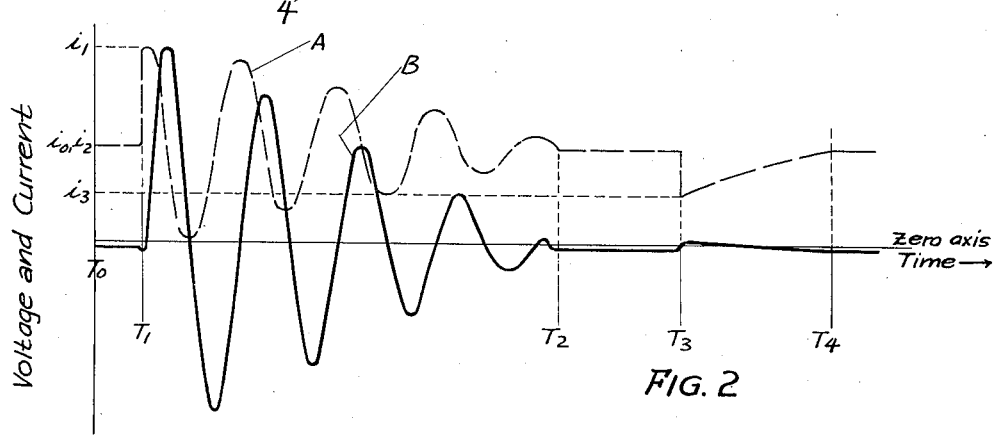
FIG. 2
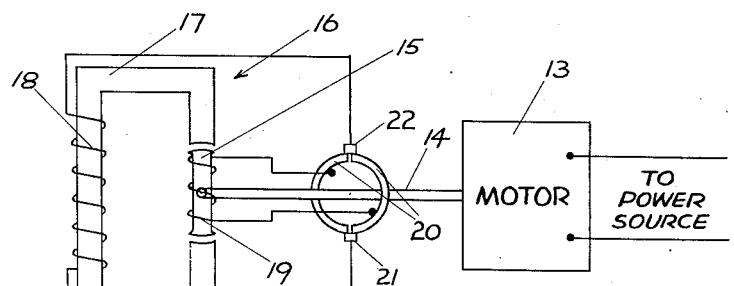
FIG. 3
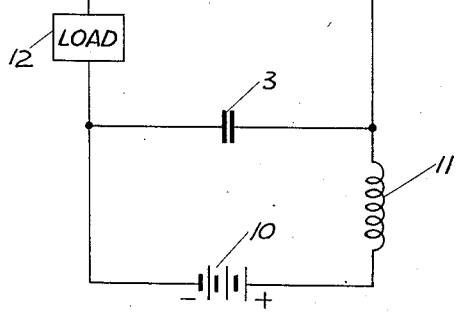
INVENTOR
JOHN W. DAWSON
BY Elmer J. Gorn
ATTY.

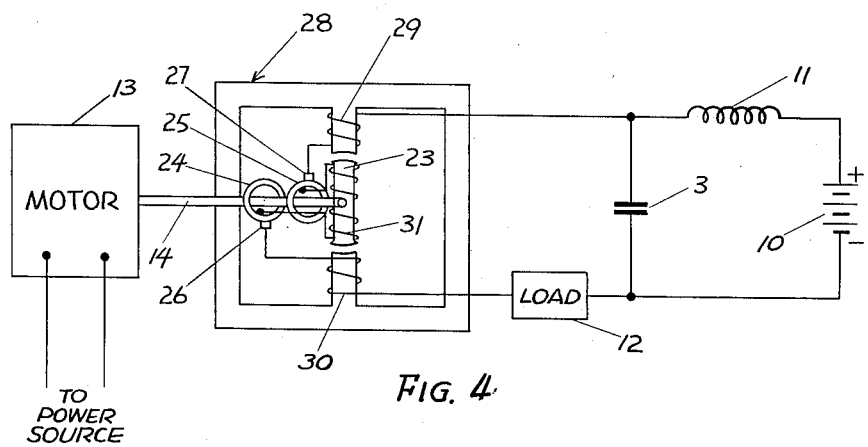
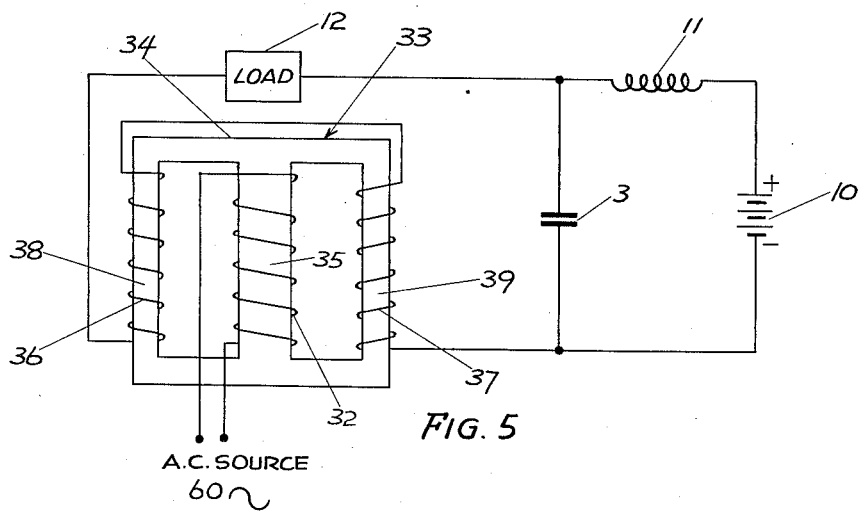

Patented May 27, 1952

2,598,232

UNITED STATES PATENT OFFICE 2,598,232

OSCILLATION GENERATOR

John W. Dawson, West Newton, Mass., assignor to Raytheon Manufacturing Company, Newton, Mass., a corporation of Delaware Application June 11, 1946, Serial No. 675,867

11 Claims. (Cl. 322—61)

This invention relates to electrical circuits, and more particularly to oscillatory circuits.

An object of the invention is to devise an oscillator which requires no electron-discharge tubes.

Another object is to device an oscillator which is very reliable, and therefore requires very little maintenance.

The foregoing and other objects of the invention will be best understood from the following description of some exemplifications thereof, reference being had to the accompanying drawings, wherein:

Fig. 1 is a schematic diagram aiding in explanation of the invention;

Fig. 2 is a set of curves explaining the operation of the invention;

Fig. 3 is a schematic representation of one means for carrying out the invention;

Fig. 4 is a schematic representation of another means for carrying out the invention; and Fig. 5 is a diagrammatic representation of another means for carrying out the invention.

Referring, now, to the drawings, and particularly to Fig. 1 thereof, there is shown, at 1, a generally U-shaped core of magnetic material, around a leg of which is a winding or coil 2 having terminals 8 and 9. Opposite ends of said winding are connected to opposite terminals of a source of excitation, here represented as a battery 10, a choke 11 and a load 12 being placed in series between one terminal of battery 10 and terminal 8 of coil 2. A condenser 3 has one terminal thereof connected to terminal 9 of coil 2 and its other terminal connected to the load end of choke 11. A fixed member 4 of magnetic material is separated slightly from the open side of the U to provide a pair of airgaps 5 and 6, in which airgaps a member 7 of magnetic material is mounted so as to be slidable therein from the position shown to a position in which it is entirely outside the limits of core 1. The relative positions of members 1, 7, and 4 are such that when member 7 is pulled out the lengths of the airgaps 5 and 6 included in the overall magnetic circuit will be doubled.

It will be assumed that the inductance involved is variable, but that for any fixed setting of inductance the number of flux linkages is proportional to the current. The following may therefore be written $$10^{-8}\Phi = Li \qquad (1)$$

where $\Phi$ is the number of flux linkages for a current of $i$ amperes. The proportionality factor L depends only upon the setting, and is independent of the current $i$. By definition L is the inductance.

The voltage across an inductance is $$e = 10^{-8}\frac{d\Phi}{dt} = \frac{d}{dt}(Li) = L\frac{di}{dt} + i\frac{dL}{dt} \qquad (2)$$

due to (1).

The magnetic field energy for any setting of inductance depends only upon the current. For any fixed setting $$\frac{dL}{dt} = 0$$

and the work done to introduce a current $i$ is $$W = \int_0^t e i\, dt = \int_0^t Li\frac{di}{dt}dt = \frac{Li^2}{2} \qquad (3)$$

since the setting of L is held fixed during the process. Equation 3 represents the magnetic energy in an inductance.

The circuit of Fig. 1 has a certain value L of inductance, and there is a certain magnetic flux therein due to current $i$ from the exciting D. C. source 10 flowing through winding 2 in the direction of the arrow. When member 7 is removed from airgaps 5 and 6, the inductance of the circuit will be substantially halved because the length of the airgaps is doubled and most of the reluctance of the magnetic circuit is in the airgaps, the inductance being inversely proportional to the length of the magnetic circuit. If the member 7 is pulled from the core 1 instantaneously, or in zero time, the inductance is halved but the flux is not changed, so according to (1) the current is doubled. The flux tends to maintain itself, and calls for an increase of current in order to do so. If we let $L_0$ represent the initial inductance, $i_0$ represent the initial current, and $W_0$ represent the initial energy, while $L_1$, $i_1$ and $W_1$ represent, respectively, the same quantities after member 7 has been instantaneously removed from the airgaps, we have $$L_1 = \frac{L_0}{2} \qquad (4)$$

and $$i_1 = 2i_0$$

From (3)

$$W_0 = \frac{L_0 i_0^2}{2}$$

and $$W_1 = \frac{L_1 i_1^2}{2}$$

Therefore, substituting the values from (4), $$W_1 = \frac{\frac{L_0}{2}(2i_0)^2}{2} = L_0 i_0^2 \qquad (5)$$

The energy supplied mechanically to the magnetic field by the pulling out of member 7 is therefore $$W_A = W_1 - W_0 = L_0 i_0^2 - \frac{L_0 i_0^2}{2} = \frac{L_0 i_0^2}{2} \quad (6)$$

Equation 6 represents the maximum energy change possible in the system when its inductance is decreased, that is, when its inductance is decreased instantaneously. This energy may be delivered to the exciting circuit or to a circuit bypassed thereto. After the instantaneous removal of member 7 from core 1, the magnetic flux in said core begins to decrease at a rapid rate because source 10, which has a fixed terminal voltage (the resistance of coil 2 being fixed), cannot supply the increased current necessary to maintain this flux. Also, this change in the current is too rapid to be passed through choke 11. Since, now, the inductance L is constant and the flux $\Phi$ is decreasing, we see from Equation 1 that the current $i$ decreases from its $i_1$ value. The rapid decrease of flux in the core causes the flux linkages through coil 2 to decrease, inducing a relatively high voltage in said coil which will tend to send current in such a direction as to oppose the change in flux which produces it, so that terminal 9 of winding 2 becomes positive with respect to terminal 8 of said winding.

The inductance of winding 2 and the capacitance of condenser 3 are designed to provide a tuned circuit which is resonant at some suitable frequency. This circuit may be thought of as a source (coil 2) in series with an inductance 2 and a capacitance 3, since for oscillatory currents choke 11 isolates battery 10 from this circuit. Such a circuit is oscillatory, and the amplitude of the oscillations decreases logarithmically, if $$r < 2\sqrt{\frac{L}{C}} \quad (7)$$

where $r$ is the total resistance of the circuit, L is the inductance of coil 2, and C is the capacitance of condenser 3.

Originally, before member 7 is removed from core 1, the voltage drop produced by current $i$ flowing from source 10 through the resistance $r$ of coil 2 is in the direction from terminal 8 to terminal 9. However, when terminal 9 becomes positive with respect to terminal 8 due to the decrease of flux linking coil 2, as stated above, the voltage across this coil is reversed, because this induced voltage is so much greater than the $ri$ drop in said coil. This source (of induced voltage) being in series with an inductance and a capacitance, the relative values of the elements being as stated in (7) above, causes an oscillatory charging of condenser 3 to take place, producing a burst or train of damped oscillations which may be utilized in a suitable load device 12. These oscillations are kept out of source 10 by means of choke 11. This train of oscillations begins at the time the magnetic flux linking coil 2 starts to decrease, the current in coil 2 oscillating about a steady-state value determined by the resistance of said coil and the voltage of source 10, and the voltage across said coil about a value determined by the steady-state current $i_0$ and the resistance of said coil, and equal to $r i_0$. The energy which appears as this train of oscillations is supplied to the system only by the mechanical force required to pull member 7 from core 1, and said energy has the value given in (6) above.

If member 7, being out of the airgaps 5—6, is pushed back into the same, the inductance of the circuit will be substantially doubled because the length of the airgaps is halved. If member 7 is pushed back into the core instantaneously, or in zero time, the inductance is doubled but the flux is not changed, so according to (1), the current is halved. The flux resists the tendency for it to increase, which decreases the current $i$. If we let $L_2$ represent the initial inductance (i. e., before member 7 is pushed back), $i_2$ represent the initial current, and $W_2$ represent the initial energy, while $L_3$, $i_3$, and $W_3$ represent respectively the same quantities after member 7 has been instantaneously pushed back into the airgaps, we have $$L_3 = 2L_2$$

and $$i_3 = \frac{i_2}{2} \quad (8)$$

From (3)

$$W_2 = \frac{L_2 i_2^2}{2}$$

and $$W_3 = \frac{L_3 i_3^2}{2}$$

Substituting the values from (8), we have $$W_3 = \frac{2L_2\left(\frac{i_2}{2}\right)^2}{2} = \frac{L_2 i_2^2}{4} \quad (9)$$

The energy added mechanically to the electrical circuit by the pushing in of member 7 is therefore $$W_R = W_3 - W_2 = \frac{L_2 i_2^2}{4} - \frac{L_2 i_2^2}{2} = -\frac{L_2 i_2^2}{4} \quad (10)$$

The minus sign appearing before the final value in (10) means that mechanical energy is not added to the electrical circuit, but that energy is transferred from the magnetic field to the mechanical system, or, in other words, force is exerted mechanically on member 7 to draw it into the airgaps. In other words, this may be termed mechanical energy returned to the mechanical system from the magnetic field.

In order to compare $W_R$ of Equation 10 with $W_A$ of Equation 6, it should be remembered that $L_2$, the inductance when member 7 is outside the core, is equal to $L_1$ and that $i_2$ is the steady-state current $i_0$. Therefore, from (4)

$$L_2 = L_1 = \frac{L_0}{2}$$

and $$i_2 = i_0 \quad (11)$$

Substituting these values into (10), we have $$W_R = \frac{\frac{L_0}{2} i_0^2}{4} = \frac{L_0 i_0^2}{8} \quad (12)$$

The net energy supplied mechanically to the system under these conditions is, therefore, from (6) and (12), $$W_N = W_A - W_R = \frac{L_0 i_0^2}{2} - \frac{L_0 i_0^2}{8} = \frac{3}{8} L_0 i_0^2 \quad (13)$$

This energy, $W_N$, is applied mechanically to the system in order to produce the oscillations, and, if the inductance changes are produced repetitively, is the net energy required to be supplied to the system for production of oscillations. If only one burst of oscillations is desired, the energy required is that given in (6), since in this case no energy is recovered.

After the instantaneous reinsertion of member 7 into the core 1, the magnetic flux in said core begins to increase because source 10 tends to restore the current $i$ to its steady-state value $i_0$ from its smaller value $i_3$. Since, now, the inductance L is constant and the flux $\Phi$ is increasing, we see from Equation 1 that the current $i$ increases from its $i_3$ value. This increase in magnetic flux due to increase of current $i$ from source 10 is relatively slow because of the high inductance of choke 11. Therefore, the voltage induced in winding 2 due to this increase of flux is relatively small, this voltage being in such a direction as to make terminal 8 of winding 2 positive with respect to terminal 9. This induced voltage, being in the same direction as the $ri$ drop across winding 2 and also being quite small, will not tend to charge condenser 3 in such a manner as to produce oscillations. Also, from energy considerations, no energy is supplied to the electrical circuit at this time for the production of oscillations because the mechanical force applied is in the negative sense, as is seen in (10) above.

In Fig. 2 are shown the current and voltage variations under the above-described conditions, that is, when the member 7 is removed instantaneously from the airgaps and is reinserted instantaneously thereinto. Curve A represents the variation of current with time in coil 2, while curve B represents the variation of voltage across said coil with time. The curves of Fig. 2 are not intended to indicate the actual values of the voltage and current, but they do indicate in a general way qualitatively the variations of these factors. At time $T_0$, the current A has its steady-state value $i_0$, determined by the resistance of coil 2 and the voltage of source 10, while voltage B has a low value which is the $ri_0$ drop across the coil 2. At time $T_1$, member 7 is instantaneously removed from the core, so that the current A is suddenly doubled, as explained above, to a value $i_1$. This increase of current causes an increased $ri$ drop in coil 2, causing voltage B to be increased in the same direction as that of the original voltage drop. Immediately after time $T_1$, current A and voltage B both oscillate, so that a train or burst of damped oscillations is produced, as described above. Current A oscillates about a "zero" line which is the steady-state current $i_0$, while voltage B oscillates about a "zero" line which is the steady-state $ri_0$ voltage drop across coil 2. There is a substantial phase displacement between current A and voltage B. At time $T_2$, the oscillatory current ceases, so that current A returns to the steady-state value $i_0$. At time $T_3$, member 7 is instantaneously reinserted into the air gaps, so that the current A is halved to a value $i_3$, as explained above. This decrease of current $i$ causes a decrease of the "negative" voltage drop B, so that curve B turns upward at this time. Current A begins to return to its normal value $i_0$ at time $T_3$, and does so rather slowly, reaching $i_0$ at time $T_4$. While this current A is increasing, the voltage B is increasing "negatively," back to its steady-state value, which value it reaches at time $T_4$. If time $T_3$ occurs before time $T_2$, that is, if member 7 is reinserted into the core 1 before the oscillations have entirely died out, no matter at what point with respect to the oscillations time $T_3$ occurs, there will be a mechanical force produced on member 7, tending to pull it into the airgaps. This force will require energy to produce it, which energy will be abstracted from the oscillatory energy of the electrical circuit, so that the oscillations will tend to be damped out at this time.

Of course, it is impossible, as a practical matter, to remove member 7 completely from the airgaps instantaneously or in zero time. As member 7 is pulled toward the right in Fig. 1, the inductance of coil 2 will begin to decrease because of the increase in length of the airgap included in the magnetic path. This will cause the flux $\Phi$ to tend to decrease also, since the flux varies directly with the inductance, according to Equation 1. This decrease of flux induces a voltage in winding 2, in such a direction as to cause the current to rise to oppose the decrease of flux. Condenser 3 has such a value of capacitance that it becomes charged very rapidly by the high voltage induced in winding 2 when the inductance of said winding first begins to decrease, causing the voltage across coil 2, or across the condenser, to rise to a high value when it is charged. As condenser 3 begins to discharge through coil 2, the current through said coil begins to rise and the voltage thereacross begins to fall. During this rise of current, the inductance of coil 2 is still being decreased because of the continual movement of member 7 outwardly with respect to core 1. As is apparent from Equation 3, the energy supplied to the magnetic field is directly proportional to the square of the current. Therefore, as the current increases, the mechanical energy supplied to the magnetic field by the force moving member 7 also increases, reaching its maximum at the same time the current again reaches its maximum in the positive direction, and again reaching a maximum when the oscillatory current reaches its maximum in a negative direction; in other words, the energy supplied varies in phase with the oscillatory current. This energy is supplied mechanically during the entire time while the inductance of coil 2 is being decreased, since, as explained above in connection with Equation 6, energy is required to be mechanically supplied in order to remove member 7 from the airgaps, decreasing the inductance. Since the energy supplied to the oscillatory circuit varies in phase with the oscillatory current, and since energy is supplied mechanically to the electrical circuit during the time the inductance of coil 2 is decreasing, it follows that oscillations of increasing amplitude are supplied to the load 12 during the time that member 7 is moving to the right in Fig. 1, or in the direction of decreasing inductance. Since the inductance of coil 2 is continuously decreasing during the time that member 7 is being pulled out of the airgaps, it follows that the oscillatory circuit is resonant at varying frequencies during the time of removal of member 7, so that oscillations of varying frequency are produced during this time. Specifically, if $r^2C$ is negligibly small as compared to $4L$ [$r$, L, and C representing the same quantities as explained above in connection with (7)], the frequency $f$ of oscillation is $$f = \frac{1}{2\pi\sqrt{LC}} \qquad (14)$$

Therefore, as the inductance L decreases, the oscillatory circuit becomes tuned for higher frequencies, so that during the time of decreasing inductance, that is, during the time member 7 is being pulled to the right in Fig. 1, oscillations of increasing amplitude and of increasing frequency are produced.

It is necessary that the inductance be varied at or above a certain rate, because the condenser 3 must be charged very rapidly in order to set up oscillations in the tuned circuit 2—3. The voltage induced in winding 2 depends on the rate of change of the inductance, and with any fixed value of capacitance the induced voltage must be high enough to charge the condenser 3 very rapidly, so that the inductance must be changed at a rate which is high enough to induce a sufficiently high voltage in winding 2. If the inductance is varied at some slower rate, the condenser 3 will continue to be charged during the entire time of inductance variation, so that oscillatory currents will not be established in the resonant circuit 2—3. From (2), we see that the voltage across an inductance depends both on the rate of change of current and the rate of change of inductance, so that the inductance must be changed at or above a certain rate if the voltage across inductance 2 is to be high enough to charge condenser 3 rapidly.

If the movement of member 7 is stopped during the time of its travel in the direction of decreasing inductance, the existing oscillations will begin to decay with logarithmically-decreasing amplitude, as shown in Fig. 2 between times $T_1$ and $T_2$, since mechanical energy is no longer being supplied. If, on the other hand, the movement of member 7 toward the right is stopped and member 7 is permitted to move toward the left, the oscillations will tend to be damped more rapidly, as explained above in connection with Fig. 2. Of course, when the movement of member 7 in the direction of decreasing inductance is stopped, the frequency of the oscillations will remain constant during the decay period, because the inductance is no longer changing to change the resonant frequency of the tuned circuit.

Since the operation of this invention depends only on the existence of magnetic flux linking a coil, the inductance of which is varied, it is not absolutely necessary that the coil be excited from a D. C. source as shown. Instead, some other means for providing magnetic flux linking the coil can be used. For example, the source 10 could be eliminated, and a permanent magnet could be used instead, being properly positioned with respect to winding or coil 2 to provide magnetic flux linking therewith. If this were done, and under the conditions of instantaneous change of inductance, the curves representing the action would be similar to those shown in Fig. 2, except that curves A and B would both lie along the "zero axis" between times $T_0$ and $T_1$, and the oscillations of voltage and current would both be about the "zero axis" of Fig. 2. The curves A and B would lie, between times $T_2$ and $T_3$ and after time $T_4$, along the "zero axis," also, since during the steady-state with a device of this kind there could be no current flow in the coil and therefore no voltage drop across the coil.

In Fig. 3, there is shown schematically a power-operated means for carrying out this invention, by means of which continuous oscillations may be produced. Similar elements to those of Fig. 1 are denoted by the same reference numerals. A driving motor 13, supplied from any suitable source of power, is adapted to rotate, through a shaft 14, the armature or rotor 15 of a commutating A. C. or universal motor 16 which includes a field or stator structure 17 on which is wound a field or stator winding 18. One end of field winding 18 is connected, through a load 12, to one side of condenser 3 and also to one terminal of a source of excitation 10. A rotor winding 19 is wound on armature or rotor 15 and has its two ends connected to respective portions of a two-segment commutator 20 which rotates with shaft 14 and on which bear two oppositely-disposed brushes 21 and 22. Brush 22 is electrically connected to the opposite end of winding 18 from load 12, while brush 21 is electrically connected to the opposite side of condenser 3 from load 12, and is also connected, through a choke 11, to the opposite terminal of source 10 from load 12. It is thus seen that field winding 18 is connected in series with armature winding 19, with the opposite ends of winding 19 being successively connected to the same end of winding 18 as shaft 14 rotates.

When a member 15 of magnetic material is changed in position with respect to the field structure 17, the reluctance of the magnetic circuit is changed, so that the flux in the magnetic circuit is also changed. Since $$\text{Flux} = \frac{\text{M. M. F.}}{\text{reluctance}} \quad (15)$$

the flux varies inversely with the reluctance if the M. M. F. remains constant. From (1) it is seen that the inductance is directly proportional to the flux, so that the inductance also varies inversely with the reluctance of the magnetic circuit. Therefore, as member 15 is rotated with respect to field structure 17 in the direction to increase the airgap therebetween, the reluctance of the magnetic circuit is increased, so that the inductance of coil 18 is decreased. By making member 15 a source of M. M. F., here done by providing a winding 19 therearound through which a current from the excitation source 10 is flowing, a greater change in flux, and therefore a greater variation of inductance of coil 18, is obtained. As member 15 rotates in a direction to increase the reluctance of the magnetic circuit, as stated above, the inductance of coil 18 is decreased.

While the member 15 is being rotated to decrease the inductance of coil 18 (there being magnetic flux linking with this coil, as in Fig. 1), the same effect is produced as is produced in the circuit of Fig. 1 when member 7 is moved toward the right to decrease the inductance. As explained above, this produces a series of oscillations of increasing amplitude and increasing frequency, the amplitude and frequency both increasing as long as the inductance is decreasing. By the use of the commutator 20, the current through winding 19, and therefore also the M. M. F. provided by member 15, is periodically reversed in accordance with the relative angular position of said member and said winding. Commutator 20 is so arranged, with respect to the angular position of member 15, that the direction of the current flow through winding 19 is reversed every 180° of rotation of member 15 at the position shown in Fig. 3, that is, when the longitudinal centerline of member 15 is collinear with the longitudinal centerline of the right-hand portion of field structure 17. If this is done, the M. M. F. of member 15 will be in such a direction that, during each 180° of revolution of member 15, said member will be rotated from a position in which the M. M. F. of member 15 tends to aid that of structure 17 toward a position in which the M. M. F. of member 15 tends to oppose that of structure 17; in other words, during each 180° of rotation of the rotor 15, the flux linking coil 18, and therefore also the inductance of coil 18, will decrease from a maximum to a minimum. Therefore, mechanical energy is supplied to member 15 during the entire 360° of its rotation, this energy appearing as energy for the production of oscillations in the tuned circuit. Since during the time of decreasing inductance, or of supply of mechanical energy, the amplitude of the oscillations continuously increases, as described above, in the system of Fig. 3 the oscillatory current builds up in amplitude continuously. Only saturation of the field structure 17 limits the oscillatory current. In actual practice, what limits the magnitude of the oscillatory current is flashing over of the commutator segments because of the large currents commutated thereby.

From the above explanation, it is seen that the original establishment of oscillations depends on the condenser 3 being charged. Therefore it is possible, in a system like that of Fig. 3, in which mechanical energy is supplied to the electrical circuit through the full 360° of rotation of the rotor and in which, therefore, the amplitude of the oscillations continuously increases, to eliminate source 10, the only essential being to have condenser 3 initially charged in order to begin the oscillations, the oscillations being then built up in amplitude due to the feeding-in of energy because of the decrease of inductance. In this case, the system is self-excited and no separate source of magnetic flux is necessary.

In Fig. 4, another embodiment of the invention is shown, in schematic fashion. The rotor 23 of a synchro is adapted to be mechanically rotated by a driving motor 13, through a shaft 14 on which are mounted two slip-rings 24 and 25 which are engaged by brushes 26 and 27, respectively. Motor 13 is supplied from any suitable source of power. The stator structure 28 of the synchro is provided with windings or coils 29 and 30, one end of coil 29 being connected to brush 27 and one end of winding 30 being connected to brush 26. The other end of coil 29 is connected to one side of condenser 3, and, through a choke 11, to one terminal of a D. C. excitation source 10. The other end of coil 30 is connected, through a load device 12, to the other side of condenser 3 and also to the other terminal of source 10. Opposite ends of rotor winding 31 of the synchro are connected to the respective slip-rings 24 and 25.

When rotor 23 is rotated with respect to stator 28 from the position shown, the airgap therebetween is increased, and, assuming the M. M. F. of rotor 23 is originally in the direction to aid the M. M. F. of stator 28, the reluctance of the magnetic circuit is increased, thereby decreasing the inductance of stator coils 29 and 30. In Fig. 4, as in Figs. 1 and 3, the magnetomotive forces are the result of current from excitation source 10 flowing through the various windings. Throughout the first 180° of rotation of the rotor 23 from the position shown in Fig. 4, the inductance of coils 29 and 30 decreases.

While rotor 23 is being rotated to decrease the inductance of coils 29 and 30 (there being magnetic flux linking with these coils, as in Fig. 1), a burst of oscillations of increasing amplitude and increasing frequency is produced, as is the case in Fig. 1, explained above, when member 7 is moved toward the right to decrease the inductance. During the second 180° of rotation of rotor 23, the airgap between opposite magnetic poles on stator 28 and rotor 23 is decreased, so that the reluctance of the magnetic circuit is decreased, thereby increasing the inductance of stator coils 29 and 30. During this second 180° of rotation of the rotor, therefore, energy is fed from the magnetic field into the mechanical driving means, as is the case in Fig. 1 when member 7 is reinserted into the airgaps to increase the inductance of coil 2. During this second 180° of rotation of the rotor 23, therefore, the oscillations will tend to be damped more rapidly than they would be if the rotor were stopped at the position of minimum inductance, as explained above in connection with the practical operation of Fig. 1. Due to the fact that, in Fig. 4, mechanical energy is fed into the electrical circuit only during 180° of the rotation of the rotor 23, thereby increasing the amplitude of the oscillations only during this time, the maximum amplitude of the oscillations developed in the tank circuit will be governed by the limited amount of mechanical energy supplied thereto.

Another embodiment of the invention, in which no moving parts are used, is shown schematically in Fig. 5. The control winding 32 of a saturable reactor 33 is connected to a source of alternating current, for example to the ordinary 60-cycle supply. Reactor 33 consists preferably of a three-legged core 34 having coil 32 wound on the central leg 35 thereof, and coils 36 and 37 wound on the outer two legs 38 and 39 thereof, coils 36 and 37 being connected in series. The coils 32, 36 and 37 are so related that any alternating current induced in coil 36 is neutralized by a substantially equal and opposite alternating voltage induced in coil 37. Coils 36 and 37 are connected in series with each other and with load device 12 across condenser 3, while a D. C. excitation source 10 is connected, in series with a choke 11, across said condenser.

Magnetic flux linking coils 36 and 37 is provided as a result of the flow of current from source 10 through said coils. Core 34 is adapted to be saturated twice during each cycle of the A. C. source, that is, on increases of current in both positive and negative directions. Saturation of the core means that the magnetic flux can no longer increase as the current increases. Therefore, from (1), we see that, since the flux can no longer increase as the current in winding 32 goes above that value necessary to produce saturation, the inductance must decrease as the current increases since the flux stays constant. Thus, it is apparent that, twice during each cycle of the A. C. source, the inductance of coils 36 and 37 goes through a cycle of decrease and then increase, since core 34 is arranged to be saturated during the upward swings of current in both the positive and the negative directions. In this modification, the energy necessary to decrease the inductance of the coils is supplied from the A. C. source which is connected to control winding 32. Energy must be supplied to the saturable reactor in order to increase the flux up to the point of saturation, and, beyond, in order to decrease the inductance of coils 36 and 37. This energy is supplied from the A. C. electrical source to the tank circuit in order to produce oscillations, instead of being supplied mechanically as in Figs. 1, 3, and 4. Energy is returned to the A. C. source during the period of increasing inductance, as in the prior modifications it is returned in mechanical form to the driving means.

While the inductance of coils 36 and 37 is decreasing, a burst of oscillations of increasing amplitude and increasing frequency is produced in the resonant circuit 36—37—3 which may be utilized in load device 12, while when the inductance of coils 36 and 37 is increasing, the oscillations will tend to be damped. In Fig. 5, as in Figs. 1, 3, and 4, the LC circuit is arranged to be oscillatory. The operation of this circuit is substantially the same as that of Fig. 1 except that the inductance is decreased and increased by an A. C. source, instead of being done mechanically. The bursts of oscillations in the resonant circuit are repeated at a rate which is equal to twice the periodicity of the alternating current supplied to control winding 32, because saturation of the core, and therefore decrease of inductance of coils 21 and 22, occurs twice during each cycle of the A. C. source.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. An oscillation generator, comprising first and second series-connected inductance coils, a capacitor connected in parallel with said coils, said capacitor dimensioned to form with one of said coils an oscillatory circuit, means to charge said capacitor prior to commencing oscillation, and means for varying the inductance of said one of said coils.

2. An oscillation generator, comprising first and second series-connected coils having inductance, a capacitor connected in parallel with said coils, said capacitor dimensioned to form with one of said coils an oscillatory circuit, means to charge said capacitor prior to commencing oscillation, and means for intermittently varying the inductance of said one of said coils.

3. An oscillation generator, comprising first and second series-connected coils having inductance, a capacitor connected in parallel with said coils, said capacitor dimensioned to form with one of said coils an oscillatory circuit, means to charge said capacitor prior to commencing oscillation, and means for periodically varying the inductance of said one of said coils.

4. An oscillation generator, comprising first and second series-connected coils having inductance, a source of direct current connected across said coils, a capacitor connected in parallel on the one hand with said source and said first coil and on the other hand with said second coil, said capacitor dimensioned to form with said second coil an oscillatory circuit, and means for periodically varying the inductance of said second coil.

5. An oscillation generator, comprising an induction machine having a stator winding and a rotor winding, a capacitor connected across both of said windings to form therewith an oscillatory circuit, means to charge said capacitor prior to commencing oscillation, and means for rotating said rotor winding with respect to said stator winding.

6. An oscillation generator, comprising an induction machine having a stator winding and a rotor winding, a source of direct current connected across said two windings in series, a capacitor connected across said two windings to form therewith an oscillatory circuit, and means for rotating said rotor winding with respect to said stator winding.

7. An oscillation generator, comprising a saturable reactor having a control winding and a controlled winding, the inductance of said controlled winding being variable in response to variation of current in said control winding, a capacitor connected in parallel with said controlled winding to form therewith an oscillatory circuit, means to charge said capacitor prior to commencing oscillation, and a source of variable current connected to said control winding.

8. An oscillation generator, comprising a saturable reactor having a control winding and a controlled winding, the inductance of said controlled winding being variable in response to variation of current in said control winding, a source of direct current connected across said controlled winding, a capacitor connected in parallel with said controlled winding to form therewith an oscillatory circuit, and a source of alternating current connected to said control winding.

9. An oscillation generator, comprising a saturable reactor having a three-legged core with a winding on each leg, a source of direct current connected across the two outer windings in series, a capacitor connected across said two outer windings to form therewith an oscillatory circuit, and a source of alternating current connected to the central winding, the inductance of said two outer windings being variable in response to variation of current in said central winding.

10. An oscillation generator, comprising first and second series-connected inductance coils, means connected across both coils for sending electrical current through said coils, a capacitor connected in parallel on the one hand with said means and said first coil and on the other hand with said second coil, said capacitor dimensioned to form with said second coil an oscillatory circuit, and means for varying the inductance of said second coil at a rate sufficient to establish oscillations in said oscillatory circuit.

11. An oscillation generator, comprising first and second series-connected inductance coils, a source of direct current connected in series with said coils, a capacitor connected in parallel on the one hand with said source and said first coil and on the other hand with said second coil, said capacitor dimensioned to form with said second coil an oscillatory circuit, said first coil being dimensioned to function as a choke, and means for varying the inductance of said second coil at a rate sufficient to establish oscillations in said oscillatory circuit.

JOHN W. DAWSON.

REFERENCES CITED

The following references are of record in the file of this patent:

UNITED STATES PATENTS

| Number | Name | Date |
|---|---|---|
| 1,865,428 | Bethenod | July 5, 1932 |
| 1,877,703 | Suits | Sept. 13, 1932 |
| 1,921,787 | Suits | Aug. 8, 1933 |
| 2,079,466 | Phillips | May 4, 1937 |
| 2,200,263 | Kramolin | May 14, 1940 |

OTHER REFERENCES

Publication, "Principles of Radio Communication," by Morecroft, pages 601 and 602. Copyright 1921.